United States Patent Office 2,831,881
Patented Apr. 22, 1958

2,831,881

AMINE SALTS OF TRIHALOMETHANEPHOS-
PHONIC AND TRIHALOMETHANEPHOS-
PHINIC ACIDS

Edward R. Bell, Concord, and Roy E. Thorpe, Berkeley, Calif., assignors to Shell Development Company, New York, N. Y., a corporation of Delaware No Drawing. Application September 23, 1955
Serial No. 536,292

13 Claims. (Cl. 260—461)

This invention relates to new organic compounds of phosphorus, particularly to the aliphatic hydrocarbon amine salts of phosphonic and phosphinic acids wherein there is a trihalomethane group linked directly to the phosphorus atom.

As used herein the terms "phosphonic acid" and "phosphinic acid" denote the acids corresponding to the formulas:

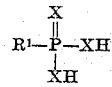

and

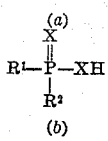

respectively, wherein $R^1$ represents the organic radical that is bonded to the phosphorus atom by a carbon-to-phosphorus bond, each X represents a non-metallic element of the chalcogen group, $R^2$ represents a hydrogen atom or a second organic group bonded to the phosphorus atom by a carbon-to-phosphorus bond. Also included within the term "phosphonic acid" are the functional derivatives of the acids represented by Formula (a) above wherein one of the two acidic groups is combined in, for example, an ester linkage.

In these compounds, any organic group linked directly to the phosphorus atom by a carbon-to-phosphorus bond will be designated by retaining the name of the hydrocarbon from which the group was derived, and by close-spacing the name of said group and the word phosphonic or phosphinic. Any group linked to the phosphorus atom by an atom, X, is designated by substituting the ending "-yl" for the ending of the name of the parent hydrocarbon and by separating the name of the group from the remainder of the name of the compound by one space. Thus the acid having the formula

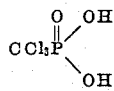

is designated trichloromethanephosphonic acid, the monoester thereof having the formula

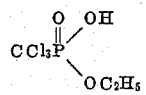

being designated ethyl trichloromethanephosphonic acid. Similarly, the acid

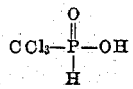

is trichloromethanephosphinic acid; the compound

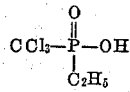

is trichloromethane(ethane)phosphinic acid, and the ester

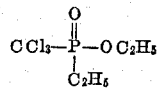

is ethyl trichloromethane(ethane)phosphinate.

Generically, the compounds of the invention are thus represented by the formula

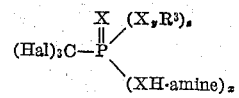

in which Hal represents a middle halogen atom, each X represents an atom of a non-metallic chalcogen element, preferably oxygen or sulfur, $R^3$ represents a hydrogen atom or an organic group, "amine" represents the amine, $x$ is 1 or 2, $y$ is 0 or 1 and $z=2-x$. It is preferred that Hal represent a chlorine atom, X represent an oxygen atom, $R^3$ represent a hydrocarbon group and $x$, $y$ and $z$ each be equal in numerical value to one, where amine is a secondary amine and that Hal represent a chlorine atom, X represents an oxygen atom and $x$ be equal in numerical value to two where amine is a primary amine.

The novel salts of this invention can be prepared by direct neutralization of the corresponding trihalomethanephosphonic or trihalomethanephosphinic acid with a substantially stoichiometrically equivalent amount of the amine, i. e., one mole of the amine per equivalent of acid. Although the neutralization reaction, which occurs at normal or moderately elevated temperatures, can be effected between the pure selected trihalomethanephosphonic or trihalomethanephosphinic acid and the pure selected amine, it preferably is carried out in the presence of an inert diluent or solvent, such as a hydrocarbon solvent, or an ethereal, a ketonic, an alcoholic or like solvent. Although the amount of the amine preferably is so adjusted that substantially complete neutralization of the amine and of the trihalomethanephosphonic or trihalomethanephosphinic acid is obtained, in all cases it is not necessary to employ fully equivalent amounts. For example, when it is desired to prepare the salt of a long-chain alkyl amine, such as dodecylamine and a trihalomethanephosphonic or trihalomethanephosphinic acid for use as an emulsifying or surface-active agent, it often may be advantageous to have present in the final composition an excess of the long-chain amine. This evidently may be accomplished simply by using a sufficient excess of the long-chain amine when neutralizing the trihalomethanephosphonic or trihalomethanephosphinic acid. Also, of the two acidic groups of the dibasic trihalomethanephosphonic acids, but one may be neutralized by reducing the amount of the amine to about half of the full equivalent amount. It also will be apparent that mixtures of amine salts of this invention can be prepared by employing either or both mixtures of amines and mixtures of trihalomethanephosphonic and/or trihalomethanephosphinic acids in the neutralization. The novel amine salts of the invention can, if desired, be purified by crystallization from solvents or by other applicable procedures which will be apparent to the art.

The trihalomethanephosphonic and trihalomethanephosphinic acids, to the amine salts of which acids this invention relates, may be prepared in turn by any suitable procedure, such as that reported by Arbusov (J. Gen. Chem. (USSR), 4, 898–900 (1934); Coover (Organic Chemical Bulletin, vol. 23, No. 4, 1951); Kosolapoff, "Organo - Phorphorus compounds," Wiley and Sons (1950), chapter 7; and in U. S. Patents Nos. 2,559,752 and 2,614,990. A particularly convenient method is that set out in copending application Serial No. 437,860, filed June 18, 1954. According to the method set out therein, the trihalomethanephosphonic acid is prepared by hydrolyzing a trihalomethanephosphonic dichloride with water in an inert water-immiscible organic solvent. The product is the monohydrate of the acid. The anhydrous acid is prepared by volatilizing the water from a mixture of the monohydrate, and an inert volatile organic solvent which enhances the volatility of water, chlorobenzene being suitable.

When it is desired to prepare an amine salt of a trihalomethanephosphonic acid in which one of the acidic groups is combined in ester linkage with an alcohol or phenol, for example, a lower aliphatic alcohol, the partial ester necessary for preparation of the salt by direct neutralization with the amine may be prepared conveniently by the novel transesterification reaction that forms in part the subject matter of copending application, Serial No. 179,004, filed August 11, 1950, now U. S. Patent No. 2,708,204, issued May 10, 1955, of which this application is a continuation-in-part. According to this method, the dibasic trihalomethanephosphonic acid and a diester thereof are heated together, in the presence of esterification catalysts, if desired, until, apparently, an equilibrium mixture is formed, the components thereof being the dibasic acid, and diester reactants, and the monoester product. The diesters of trihalomethanephosphonic acids can be prepared by known methods from tetrahalomethanes and triesters, preferably trialkyl esters, of $H_3PO_3$ or from tetrahalomethanes and alkali metal derivatives of diesters of $H_3PO_3$.

Although the salts of this invention can be prepared directly by neutralization of the desired trihalomethanephosphonic or trihalomethanephosphinic acid with an amine, in some cases it may be desirable to proceed directly from an ester of the trihalomenthanephosphonic or trihalomethanephosphinic acid to the desired salt. Thus, in some cases the necessary free trihalomethanephosphonic or trihalomethanephosphinic acid may not be readily available, or, at least, the ester may be more readily available than the acid. The salts of this invention can also be prepared by reacting a hydrohalogenide of the amine with an ester, preferably a lower alkyl ester, of the selected trihalomethanephosphonic or trihalomethanephosphinic acid according to the illustrative equation:

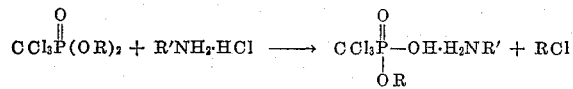

This method, which forms in part the subject-matter of copending application Serial No. 242,575, filed August 18, 1951, now U. S. Patent No. 2,674,616, issued April 6, 1954, comprises heating the amine hydrohalogenide, for example, the hydrochloride, and the ester of the trihalomethanephosphonic or trihalomethanephosphinic acid together at an elevated temperature, while removing the liberated organic halide as rapidly as it is formed. When the salts of this invention are prepared in this way they may be purified by crystallization from solvents or by other suitable methods, or, depending upon their intended use, they may be used in the relatively less pure form directly resulting from the reaction.

The trihalomethanephosphinic acids which are used to prepare the novel salts of this invention may contain as the halogen any one or more of the middle halogen elements—i. e., chlorine and bromine. It will thus be seen that the trihalomethyl group may contain only like halogen atoms, and that it may also contain atoms of one or more halogens. Of especial value because of the availability of the raw materials necessary for their preparation and also because of their outstanding utility as, for example, extreme pressure additives for lubricants and cutting oil compositions and as anti-corrosion agents, are the salts in which the trihalomethyl group is the trichloromethyl group. The secondary phosphinic acids from which we may prepare salts of this invention may contain two trihalomethyl groups directly bonded to the phosphorus atom, or they may contain but one trihalomethyl group bonded to the phosphorus atom and the second organic group bonded to the phosphorus atom may be dissimilar thereto. Such dissimilar organic group may be an alkyl group in which less than all of the hydrogens have been replaced by halogen, or it may be an unsubstituted hydrocarbon group or a hydrocarbon group which is substituted to a minor extent by non-functional substituents which do not alter the essentially hydrocarbon nature of the hydrocarbon group. Such non-functional substituents include, for example, alkoxy, aryloxy, alkyl-mercapto, hydroxy, nitro, and the like.

In its generic concepts, the invention is considered as pertaining generically to the aliphatic hydrocarbon amine salts of the trihalomethanephosphonic and the trihalomethanephosphinic acids as hereinbefore and hereinafter defined. Suitable amines from which the salts of this invention can be prepared thus include the aliphatic primary amines, including, without being limited to, methylamine, ethylamine, propylamine, butylamine, s-butylamine, amylamine, n-octylamine, ethylene diamines, 2-ethylhexylamine, t-butylamine, 1,1,2 - trimethylpropylamine, 1,3-dimethylbutylamine, 4-methyl-2-pentylamine, 3,3,5-trimethylhexylamine, cetylamine, tetradecylamine, hexadecylamine, 2,2,4-trimethylpentylamine, 2,2,3,3,6-pentamethylheptylamine, dodecylamine, octadecylamine, and higher alkyl primary amines containing up to 30 or more carbon atoms; alicyclic amines, including, without being limited to, cyclohexylamine, 3,3,5-trimethylcyclohexylamine, cyclopentylamine, 4-phenylcyclohexylamine, methylcyclohexylamines, and homologs and analogs thereof; and also unsaturated primary amines, such as allylamine, propargylamine, methallylamine, cyclohexenylamine, oleylamine, linoleylamine, and homologs and analogs thereof; and polyamines such as diethylenetriamine, trimethylenediamine. Secondary amines which are suitable for preparing novel salts of this invention include the dialkyl and substituted dialkyl amines, such as dimethylamine, diisopropylamine, dibutylamine, N-methylbutylamine, N,N'-diallyl trimethylenediamine, diamylamine, dihexylamine, di-2-ethylhexylamine, dioctylamine, di-2,2,4-trimethylpentylamine, di-3,5,5-trimethylhexylamine, N-ethylcetylamine, didodecylamine, ditetradecylamine, diricinoleylamine, N-isopropylstearylamine, N-butylricinoleylamine, N-isoamylhexylamine, N-ethyloctylamine, dioctadecylamine, and their homologs and analogs; the secondary cycloalkylamines, such as dicyclohexylamine, N-methylcyclohexylamine, dicyclopentylamine, N-octylcyclohexylamine, N-octyl-3,5,5-trimethylcyclohexylamine, and their homologs and analogs; and unsaturated secondary amines, such as diallylamine, N-ethylallylamine, N-octylallylamine, dioleylamine, N-isopropylolelyamine, N-methyl-3,3,5-trimethyl-5-cyclohexenylamine, N-amyl-linoleylamine, N-methyl-propargylamine, and their analogs and homologs. Tertiary amines which may be employed for preparing novel salts of this invention include among others, triethylamine, tri-isopropylamine, tributylamine, N-ethyldibutylamine, N-ethyl-N-butylamylamine, N,N-diethylaniline, triallylamine, N,N-dipropylcyclohexylamine, N,N-dipropyloleylamine, trimethylamine, N-octyldiallylamine, N,N-dipropylcyclohexylamine, and their analogs and homologs. Heterocyclic amines, wherein an amino nitrogen atom is embraced within a heterocyclic ring or group, such as piperidine, pyridine, 2,2,4,6-tetramethylpiperidine, 2,2,4,6-tetramethyl-tetrahydropyridine, N-ethyl - 2,2,4,6 - tetramethylpiperidine, 2-aminopyrimidine and the like, may also be employed. The amines which we may employ for preparing the novel amine salts of this invention may be represented by the formula $$NR^aR^bR^c$$

wherein $R^a$ and $R^b$ are hydrogen or aliphatic hydrocarbon radicals, and $R^c$ is an aliphatic hydrocarbon radical. $R^a$ and $R^c$ may be joined together and with the nitrogen atom form a nitrogenheterocyclic, preferably saturated ring. The amine may contain from 1 to as many as 36 or more carbon atoms, a preferred group of amines being those which contain from 10 to 36 carbon atoms per molecule. It may also be stated that amines contain only the elements carbon, nitrogen and hydrogen.

A particularly preferred group of these amines are the primary, secondary and tertiary aliphatic amines, particularly such amines wherein each alkyl group is a higher highly branched primary or secondary aliphatic amine, including 1,1- or 2,2-dialkyl alkyl amines containing a tertiary or quaternary carbon atom in the molecule as represented by formulas

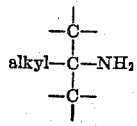

or

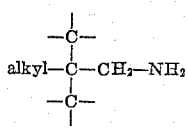

Primary amines for use in forming the salts of this invention can be prepared by any suitable means such as described in the U. S. Office of the Publication Board Report No. 88843 or by converting primary branched chain alcohols as produced by the Oxo process from branched chain olefins as fully described by P. W. Sherwood in the Oil and Gas Journal, June 9, 1949, page 71, and in the February 1953 issue of Petroleum Processing, to the corresponding nitriles and converting the nitrile to the amine by catalytic hydrogenation. Another method is to convert alcohols to the corresponding halides and forming the amines derived from the halide in the customary manner such as by reacting with ammonia.

The tertiary alkyl primary amines, containing as the tertiary alkyl radical the radical of the polyisobutylene, polypropylenes and mixtures thereof are preferred. Accordingly, 1,1,3,3-tetramethylbutylamine (from the amination of diisobutylene), 1,1,3,3,5,5-hexamethylhexylamine (from triisobutylene), 1,1,3,3,5,5,7,7-octamethyloctylamine (from tetraisobutylene) and 1,1,3,3,5,5,7,7,9,9-decamethyldecylamine (from pentaisobutylene) are specific preferred amines, which are suitably used individually or as admixtures thereof. In addition to these tertiary alkyl primary amines, 2,2,4,4-tetramethyl pentylamine, 2,2,4,4,6,6-hexamethyl heptylamine, and the like, can be used.

Other tertiary branched-chain alkyl primary amines which can be used include the $C_8$ and higher amines of this type mentioned in U. S. Patents Nos. 2,160,058, 2,606,923 and 2,611,782 such as tert.-tridecylamine

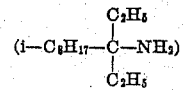

as well as isoheptyldiethylcarbinylamine, isooctylethylpropylcarbinylamine, and the like. Primary amines of this type are commercially available from Rohm and Haas Co. under the trade name of "Primenes."

The following are the properties of some amines which can be used to form the amine salts for use in lubricating compositions of this invention.

Table I.—Properties

|  | Tertiary-Octyl-amine | $A_1$ | $A_2$ | $A_3$ |
|---|---|---|---|---|
| Formula | $t\text{-}C_8H_{17}NH_2$ | Principally $t\text{-}C_{12}H_{25}NH_2$ to $t\text{-}C_{15}H_{31}NH_2$. | Principally $t\text{-}C_{12}H_{25}NH_2$ to $t\text{-}C_{15}H_{31}NH_2$. | Principally $t\text{-}C_{18}H_{37}NH_2$ to $t\text{-}C_{24}H_{49}NH_2$. |
| Molecular Weight | 128 | | 208 | 301. |
| Average Molecular Weight | 131 | 191 | | |
| Specific Gravity, 25° C | 0.771 | 0.812 | 0.833 | 0.828. |
| Refractive Index, 25° C | 1.423 | 1.447 | 1.449 | 1.455. |
| Boiling Point (or range) | 137–143° C. (760 mm.). | 5–90% at 210–227° C. (760 mm.). | 4–90% at 204–245° C. (760 mm.). | Principally 269–353. 5–95% at 275–340° C. (765 mm.). |

It is preferred that the aliphatic amines be alkyl amines and that each amine contain at least eight carbon atoms.

Within the more generic concepts of this invention there are certain more limited groups of novel amine salts which are set out below. These more limited groups are represented by the formulas:

(1) 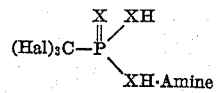

(2) 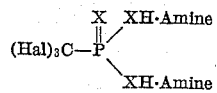

(3) 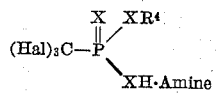

(4) 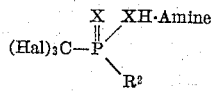

wherein X and $R^2$ have the definitions hereinbefore stated, and $R^4$ represents an organic group, preferably a hydrocarbon group. It is preferred that Hal represent a chlorine atom, that $R^2$ and $R^4$ each represent an alkyl group containing from 1 to about 10 carbon atoms and that the amine be of the preferred class set out hereinbefore.

The novel salts of this invention are useful as anticorrosion agents, as additives for lubricants of the predominantly hydrocarbon variety as well as of the synthetic types, and as additives for improving the properties of materials suitable for use as cutting fluids, coating compositions, textile-treating compositions, and flame-proofing agents. The salts of long-chain amines, particularly the salts of aliphatic amines containing from 10 to 18 carbon atoms, may be employed as surface-active agents, wherein they may contribute in addition to their surface-active characteristics useful rust or corrosion inhibiting properties which reduce deleterious effects of the medium, e. g., oil, emulsion, or the like, upon metal parts with which it comes into contact. The compounds of this invention include biologically active compounds which are useful as insecticides, fungicides, and the like. Of outstanding interest are the oil-soluble primary and secondary alkyl amine salts of the alkyl trichloromethanephosphonic acids in which each of the alkyl groups of the amines is a highly branched alkyl group of the preferred class set out hereinbefore. They may be added in small amounts, with or without other additives of conventional types, to lubricants such as hydrocarbon oils, synthetic oils such as polymers and copolymers of alkylene glycols and alkylene oxides, or organic esters, such as 2-ethylhexyl sebacate, etc., to provide lubricants having greatly enhanced extreme pressure properties, that is, greatly enhanced suitability to use under conditions of extreme pressure upon the lubricant film as is encountered in hypoid gears, heavily loaded bearings, and like applications. Solutions thereof in the same or lighter vehicles are valuable as cutting oils or ingredients of cutting oils, and to this end there may be employed as the vehicle light naphthas, kerosene, aromatic solvents, and the like, as well as the more viscous or heavier oils. Such cutting oils may be employed as emulsions in water. The salts of this invention are also useful as additives to hydraulic fluids for example, phosphonate ester-base hydraulic fluids, and synthetic carboxylic acid ester-base hydraulic fluid wherein they serve to prolong the life of mechanical pumps and other equipment employed in or for transmission of power by means of such fluids. The salts of the invention also can be used for flame-proofing of textiles, paper, wood, and other flammable materials.

The salts of the invention provide a new class of materials useful as extreme pressure agents for compositions used as lubricants and as cutting fluids. While it has been known heretofore that trichloromethanephosphonic acid and the mono- and diesters thereof are useful for imparting excellent extreme pressure properties to lubricants and cutting fluids, these classes of compounds were not entirely suitable, because of their marked corrosivity toward ordinary metals, and instability in storage and in use or their low solubility in oils. The amine salts of this invention have been found to be substantially equivalent to the acid and the esters thereof in their ability to impart extreme pressure and load carrying properties to lubricating oil and grease and cutting oil compositions, while at the same time being oil-soluble, substantially non-corrosive, and stable in storage and use.

The following examples will illustrate various of the novel salts of this invention and their preparation. It will be appreciated that the examples are presented with the intent to illustrate rather than to limit the invention as it is defined in the hereto appended claims. In the examples the parts are by weight unless otherwise specified.

*Example I.—Preparation of a trihalomethanephosphonic acid and of an alkyl trihalomethanephosphonic acid.—* Di-n-butyl trichloromethanephosphonate, prepared from carbon tetrachloride and tri-n-butyl phosphite, is heated at 180° C. at atmospheric pressure. During the heating gas is evolved; a collected sample is found to be largely butylene. The heating is continued until the material changes from liquid to solid. The solid product is purified by extraction of soluble materials in carbon tetrachloride. The portion remaining after the extraction is found by analysis to be better than 90% pure trichloromethanephosphonic acid.

The trichloromethanephosphonic acid thus produced was purified by crystallization of the crude acid from concentrated nitric acid and thereafter drying the crystals in a vacuum to remove traces of the nitric acid.

An attempt was made to test the pure acid as an extreme pressure additive for lubricant compositions. The acid was found to be quite insoluble in various oils. Further, the acid has been found to be too corrosive toward ordinary metals of construction to be a satisfactory component of lubricant compositions.

Tests of di-n-butyl trichloromethanephosphonate show that while it is oil-soluble, it, too, is inherently corrosive to metals and has substantially less value as an extreme pressure additive than the free acid, so that it must be used in relatively high concentrations to confer satisfactory extreme pressure characteristics to the lubricant composition.

*Example II.—*A portion of trichloromethanephosphonic acid prepared as in Example 1 above is mixed with an equimolar amount of di-n-butyl trichloromethanephosphonic acid and the mixture is heated at 100° C. for 32.5 hours. The crude mixture thus prepared is extracted with a 10% solution of sodium hydroxide in water in an amount equivalent to the acid content of the mixture as determined by titration of an aliquot. The aqueous extract, after washing with benzene and with diethyl ether followed by treatment with activated carbon, is acidified by addition of concentrated hydrochloric acid, and the acidified solution is extracted with diethyl ether. The ether is evaporated from the extract. The residue from the evaporation is topped in a molecular still operating with the thimble at 36° C. The bottoms fraction is found by potentiometric titration to contain 78% by weight of butyl trichloromethanephosphonic acid along with minor amounts of trichloromethanephosphonic acid and di-n-butyl trichloromethanephosphonate. Analysis of the bottoms fraction: 23.5% carbon, 4.6% hydrogen, 11.9% phosphorus, 37.9% chlorine.

Tests of this mixture shows that it is soluble in oil and is comparable to the free dibasic acid in extreme pressure properties but is very prone to sludge formation and decomposition and is quite corrosive to steel at temperatures within the range ordinarily encountered in the use of lubricating compositions.

*Example III.—n-Octadecylammonium butyl trichloromethanephosphonate.—*A portion of n-butyl trichloromethanephosphonic acid is dissolved in ethanol and to the solution there is added the theoretical amount of n-octadecylamine dissolved in a hot 50–50 mixture of benzene and ethanol. The resulting solution is cooled, filtered, evaporated to dryness and the salt which remains as the residue from the evaporation is taken up in a hot mixture of benzene and ethanol and crystallized therefrom by cooling. Analyses: Found, 5.92% P, 20.4% Cl and 2.48% N. Calculated, 6.3% P, 20.35% Cl, and 2.67% N. A 1.7% solution of the n-octadecylammonium butyl trichloromethanephosphonate in a light mineral oil (SAE 10 wt.) has better extreme pressure properties than the oil without the added n-octadecylammonium butyl trichloromethanephosphonate. An even better extreme pressure lubricant is obtained, by substituting for the n-octadecylammonium trichloromethanephosphonate of this example the di-2-ethylhexylammonium butyl trichloromethanephosphonate prepared as in the following example. In addition to its utility as an extreme pressure additive, the n-octadecylammonium butyl trichloromethanephosphonate is useful as a surface-active agent and as an additive to cutting fluids.

*Example IV.—Di-2-ethylhexylammonium butyl trichloromethanephosphonate.—*To di-2-ethylhexylamine is added slowly with agitation an amount of the product of Example I sufficient to neutralize the amine, the mixture being cooled during the neutralization as required to keep the temperature below about 50° C. The resulting oil-soluble salt upon incorporation in lubricating oils imparted excellent extreme pressure properties thereto and is further characterized by the following properties:

Specific gravity (20/4) _____ 1.0463
Viscosity at 100° F. (cs.) _____ 1013
Viscosity at 210° F. (cs.) _____ 67.3
Chlorine content, weight percent _____ 15.3

*Example V.—Di(octadecylammonium) trichloromethanephosphonate. —* Trichloromethanephosphonic acid, prepared as in Example I, is dissolved in ethanol and to the solution there is added an ethanol-benzene solution of octadecylamine in an amount equivalent to the amount of the acid. The resulting solution is filtered, and the solvent evaporated from the filtrate. The residue, di-(octadecylammonium) trichloromethanephosphonate, is analyzed for carbon hydrogen, nitrogen, phosphorus, and chlorine.

|  | Found | Calculated for $C_{27}H_{59}O_2N_2PCl_3$ |
|---|---|---|
| Percent carbon | 56.6 | 60.2 |
| Percent hydrogen | 11.0 | 10.9 |
| Percent phosphorus | 4.3 | 4.2 |
| Percent chlorine | 14.4 | 14.5 |
| Percent nitrogen | 2.92 | 3.80 |

*Example VI.—Mono(octadecylammonium) trichloromethanephosphonate.*—The procedure of Example V is repeated except that one-half of the theoretically required amount of octadecylamine is used. The mono(octadecylammonium) trichloromethanephosphonate is analyzed.

|  | Found | Calculated for $C_{19}H_{41}O_3NPCl_2$ |
|---|---|---|
| Percent carbon | 48.8 | 47.9 |
| Percent hydrogen | 8.9 | 8.0 |
| Percent phosphorus | 6.63 | 6.52 |
| Percent chlorine | 22.9 | 22.40 |
| Percent nitrogen | 2.80 | 2.94 |

*Example VII. — Di-2-ethylhexylammonium trichloromethane(benzene)phosphinate.*—Butyl trichloromethane-(benzene)phosphinate is prepared by reaction of dibutyl benzenephosphonite and carbon tetrachloride according to known methods, and the ester thus obtained is heated at 100°–200° C. with an about equimolar amount of di-2-ethylhexylamine until evolution of butyl chloride ceases. The resulting crude salt, consisting essentially of di-2-ethylhexylammonium trichloromethane(benzene)-phosphinate, has properties such that it imparts excellent extreme pressure properties to lubricating oils when incorporated therein in small amounts, e. g., in amounts of from about 0.1% to about 2% by weight.

*Example VIII.—Bis(di-2-ethylhexylammonium) trichloromethanephosphonate.*—This salt is prepared by direct neutralization of the trichloromethanephosphonic acid with the equivalent amount of di-2-ethylhexylamine. The salt is an oil-soluble glassy light yellow solid which, upon incorporation in lubricating oils, enhances the extreme pressure properties of such oils.

*Example IX.*—Compositions of this invention were evaluated as extreme pressure agents by use of the four-ball extreme pressure lubricating tester similar in principle to the Boerlage apparatus described in the magazine Engineering, volume 136, July 13, 1933. This apparatus comprises four steel balls arranged in a pyramid formation. The top ball is rotated by a spindle against the three bottom balls which are clamped in a stationary ball holder. The balls are immersed in the composition to be tested. Tests were run under conditions indicated in the following table and compared with other outstanding extreme pressure compounds.

TABLE II.—FOUR-BALL EVALUATION OF EP COMPOSITIONS

[1620 R. P. M.; 1 minute, steel on steel, ambient temperature.]

| Base Oil [1] | Additive | Amount, Percent wt. | Initial Seizure Load, Kg. |
|---|---|---|---|
| A |  |  | 40–45 |
| B |  |  | 40–45 |
| C |  |  | 40–45 |
| D |  |  | 40 |
| C | Ex. IV | 1.5 | 170–180 |
| D | Ex. IV | 1.0 | 140–150 |
| A | Ex. IV | 1.0 | 150–160 |
| B | Ex. IV | 1.0 | 150–160 |
| A | Ex. XV | 1.0 | 170–180 |
| A | Ex. XVIII | 1.0 | 170–180 |
| A | Dihexylammonium salt of butyl trichloromethane phosphonic acid. | 1.0 | 170–180 |
| B | ------do------ | 1.0 | 170–180 |

[1] A—SAE 90 mineral lubricating oil; B—SAE 30 mineral lubricating oil; C—SAE 10w mineral lubricating oil; D—synthetic lubricant (di-2-ethylhexyl sebacate).

THERMAL STABILITY TEST

Compositions of this invention were also evaluated for their extreme pressure properties on a spur-gear machine, which essentially consists of two geometrically similar pairs of gears connected by two parallel shafts. The gear parts are placed in separate gear boxes, which also contain the supporting ball bearings. One of the shafts consists of two sections connected by a coupling. Loading is accomplished by locking one side of the coupling and applying torque to the other. The conditions and results of the tests were:

Speed: 3000 R. P. M.
Test duration: 5 minutes running at each load.
Specimen: involute spur gear (SAE 3312 steel).

| Composition: | Score load (lbs.) |
|---|---|
| Mineral oil | 5 |
| Mineral oil+1% of additive of Ex. IV | 85 |

Compositions of this invention were also tested in the hypoid gear machine which essentially is built on the four-square (closed power circuit) principle. The first two corners of the square are formed by commercial hypoid gears and the other two by helical gears. A pair of helical gears placed on a common shaft and mating with the corner gears can be moved by hydraulic pressure along the shaft axis. This movement, which can be accomplished while the machine is running, produces torque in the system, proportional to the hydraulic pressure. The machine is operated at speeds as high as 3500 R. P. M. and is equipped with a sensitive hydraulic pressure regulating system, air and water cooling systems and means for measuring the temperature of different parts. Results of this test are:

| Composition | Hypoid Gear Load Carrying Capacity (p. s. i.) |
|---|---|
| Mineral oil | 20 |
| Mineral oil+1% of Additive of Ex. IV | 120+ |

A steel ball is immersed in the test composition which is maintained at a temperature range of from 105° C. to 130° C. for a 30-day period during which time the condition of the steel ball and test composition is observed periodically. The results obtained with compositions tested are tabulated below:

Mineral oil containing the following additives in the amount indicated:

| Additive | Amount, Percent | Thermal Stability Results |
|---|---|---|
| Di (2 - ethylhexyl) ammonium salt of butyl trichloromethane-phosphonic acid. | 0.5 | Passed 30-day test with no sludge or corrosion formation. |
| Do | 1.0 | Same results. |
| Dibutyl trichloromethane-phosphonate. | 1.0 | Sludged after 3 days. |

*Example X.*—In a suitable vessel trichloromethanephosphonic acid was reacted at a temperature of around 50° C. with a mixture of t-$C_nH_{2n+1} \cdot NH_2$ salts wherein $n$ is a whole number from 18 to 24 ($A_3$) in an amount sufficient to neutralize the total acidity of the acid, namely one molecule of the acid was reacted with two moles of the amine. The product formed had the formula

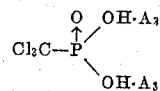

This salt was completely soluble in mineral oil and possessed excellent extreme pressure properties. Using two moles of a mixture of salts wherein $n$ is a whole number from 12 to 15 ($A_1$) in forming the above type of salt, the final product had the formula

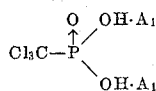

Another excellent extreme pressure additive having good oil solubility was prepared in the manner described above using only half the stoichiometric amount of amine ($A_3$) required to neutralize the total acidity of trichloromethanephosphonic acid. The product formed had the formula

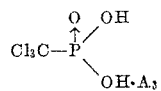

*Example XI.*—Certain of the new amine salts were further evaluated in the L–19 engine test described in the 1946 CRC Handbook published by the Coordination Research Council in the four-ball extreme pressure test (Engineering, vol. 136, July 13, 1933) and for their solubility and stability in mineral oils in concentrations such that the solutions contained 0.4% by weight of chlorine by storing the solution under different temperature conditions and observing whether any phase separation occurred. Some of these salts were tested additionally in the L–20 engine test described in the 1946 CRC Handbook. The results are presented in Table II.

TABLE III.—MINERAL OIL BASE, ADDITIVE PRESENT IN AMOUNT OF 0.4% Cl

| Additive | Test Results | | 4-Ball Test (1,800 R. P. M.; 10 sec. steel on steel, ambient temp.) | Stability | | | |
|---|---|---|---|---|---|---|---|
| | L–19 | L–20 | | 65–70° F. | Time | 20–25° F. | Time |
| $A_3$* salt of trichloromethane phosphonic acid (TAN)**. | Passed.. | Passed.. | 126–141 | Clear fluid, no separation. | 6 mo........ | Same... | 6 mo. |
| $A_1$* salt of trichloromethane phosphonic acid (TAN). | ---do---- | ---do---- | 126–141 | -----do--------- | 6 mo........ | Same... | 6 mo. |
| $A_1$* salt of trichloromethane phosphonic acid (SAN)**. | ---do---- | | 126–141 | -----do--------- | 6 mo........ | Same... | 6 mo. |
| $A_3$* salt of trichloromethane phosphonic acid (SAN). | ---do---- | | 126–141 | -----do--------- | 6 mo........ | Same... | 6 mo. |
| Dimethylneopentyl carbinyl amine salt of trichloromethane phosphonic acid (TAN). | ---do---- | Passed.. | 126–141 | -----do--------- | 6 mo........ | Same... | 6 mo. |
| Mono(di-2-ethylhexylamine) salt of trichloromethane phosphonic acid (TAN). | ---do---- | ---do---- | 126–141 | | | | |
| Trichloromethane phosphonic acid. | Too insoluble to test | | | Heavy Sludge or gel. | immediate.. | Same... | immediate. |

*Note Table I.
**TAN=total acidity neutralized, SAN=strong acidity neutralized.

*Example XII.*—Tests were conducted to determine the value of the new amine salts as additives for cutting oils. The test procedure was as follows: 13 N. C. threads were cut for a distance of two inches on a one-half inch diameter rod of cold finished AISI–1020 steel, using tangent chaser dies, at speed increments of 125 R. P. M. until the thread obtained failed to meet class 3 commercial specifications. The results are reported as the average speed at which passable threads are obtained, for at least three different sets of classes. The base oil used was Premium Machine Oil 27 (a Pale Oil having a viscosity of 155 SSU at 100° F).

(*a*) Trichloromethanephosphonic acid was found to stain the tool and other metals it contacted. The acid is thus too corrosive for use as an additive for cutting oils.

(*b*) The base oil, with no additive, permitted speeds of less than 150 R. P. M.

(*c*) Both the mono- and di-(di-2-ethylamine) salts of trichloromethanephosphonic acid at a concentration of about 1% w. permitted speeds of 525 R. P. M. These solutions did not stain the tool or other metals they contacted.

*Example XIII.*—A second test for evaluating the new amine salts as additives for cutting oils consisted of drilling successive holes, with a specially sharpened ⅜ inch diameter twist drill, one and one-half inches deep in a bar of AISI–4340 steel until the drill point fails. The drill was fed at a rate of 0.006 inch per minute at 1240 R. P. M. The results are reported as the average number of holes drilled before failure of the drill point for at least three drills. The base oil was Sulfurized Pale Oil (Pale Oil having a viscosity of 150 SSU at 100° F. and containing 1% total sulfur).

The following test results were obtained:

(*a*) Trichloromethanephosphonic acid was found unsatisfactory because compositions containing it were found to stain the drill and the test metal.

(*b*) The base oil with no additive permitted 33 holes before failure of the drill point.

(*c*) About 1% w. of the di(di-2-ethylhexylamine) salt of trichloromethanephosphonic acid permitted 136 holes before failure of the drill point. The composition did not stain the drill or test metal.

*Example XIV.*—*2,2,4,6-tetramethylpiperidinium butyl trichloromethanephosphonate.*—A mixture of butyl trichloromethanephosphonic acid trichloromethanephosphonic acid and dibutyl trichloromethanephosphonate prepared as in Example II is added to an amount, equivalent to the acid content of the mixture, of 2,2,4,6-tetramethylpiperidine while agitating and maintaining the temperature at about 50° C. There is obtained a viscous oil consisting chiefly of 2,2,4,6-tetramethylpiperidinium butyl trichloromethanephosphonate along with lesser amounts of bis(2,2,4,6-tetramethylpiperidinium) trichloromethanephosphonate and small amounts of dibutyl trichloromethanephosphonate.

*Example XV.*—*Bis(1 - isobutyl - 3 - methylbutyl)ammonium butyl trichloromethanephosphonate.*—This salt is prepared by neutralizing butyl trichloromethanephosphonic acid with the theoretically required amount of bis-(1 - isobutyl - 3 - methylbutyl)amine dissolved in a 50–50 mixture of ethanol and benzene. The solvent is evaporated off to leave as an oil soluble residue the bis(1-isobutyl-3-methylbutyl)ammonium butyl trichloromethanephosphonate.

*Example XVI.*—*N - methyloctadecylammonium 2-hydroxyethyl trichloromethanephosphonate.*—This salt is prepared by direct neutralization of N-methyloctadecylamine with 2-hydroxyethyl trichloromethanephosphonic acid as in the preceding examples.

*Example XVII.*—*Dicyclohexylammonium salt of butyl tribromomethanephosphonic acid.*—This salt is prepared by neutralizing butyl tribromomethanephosphonic acid with the theoretically required amount of dicyclohexylamine to produce an oil-soluble dicyclohexylammonium butyl tribromomethanephosphonic acid.

This application is a continuation-in-part of our copending application Serial No. 242,574, filed August 18, 1951, which, in turn is a continuation-in-part of our application, Serial No. 179,004, filed August 11, 1950, now U. S. Patent No. 2,708,204, issued May 10, 1955.

We claim as our invention:

1. An amine salt having the formula

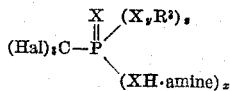

wherein Hal represents a halogen atom of the group consisting of the bromine and chlorine atoms, X represents a non-metallic chalcogen atom, $R^3$ represents a member of the class consisting of the hydrogen atom and lower hydrocarbon groups, amine represents an aliphatic hydrocarbon amine, $x$ represents an integer selected from the group 1 and 2, $y$ represents an integer selected from the group 0 and 1, and $z=2-x$.

2. An amine salt having the formula

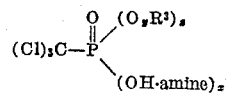

wherein $R^3$ represents a member of the class consisting of the hydrogen atom and lower hydrocarbon groups, amine represents an aliphatic hydrocarbon amine, $x$ represents an integer selected from the group 1 and 2, $y$ represents an integer selected from the group 0 and 1, and $z=2-x$.

3. An amine salt having the formula

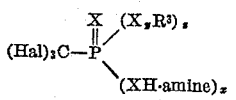

wherein Hal represents a halogen atom of the group consisting of the bromine and chlorine atoms, X represents a non-metallic chalcogen atom, $R^3$ represents a member of the class consisting of the hydrogen atom and lower hydrocarbon groups, amine represents a secondary aliphatic hydrocarbon amine, $x$ represents an integer selected from the group 1 and 2, $y$ represents an integer selected from the group 0 and 1, and $z=2-x$.

4. An amine salt having the formula

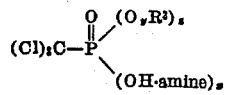

wherein $R^3$ represents a member of the class consisting of the hydrogen atom and lower hydrocarbon groups, amine represents a secondary aliphatic hydrocarbon amine containing from about 10 to about 36 carbon atoms, $x$ represents an integer selected from the group 1 and 2, $y$ represents an integer selected from the group 0 and 1, and $z=2-x$.

5. The di-2-ethylhexylammonium salt of trichloromethane-phosphoric acid.

6. The di-octadecylammonium salt of trichloromethanephosphonic acid.

7. The di-2-ethylhexylammonium salt of butyl trichloromethane-phosphonic acid.

8. An amine salt having the formula

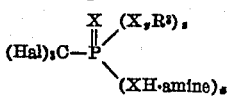

wherein Hal represents a halogen atom of the group consisting of the bromine and chlorine atoms, X represents a non-metallic chalcogen atom, $R^3$ represents a member of the class consisting of the hydrogen atom and lower hydrocarbon groups, amine represents a long-chain highly branched primary aliphatic hydrocarbon amine, $x$ represents an integer selected from the group 1 and 2, $y$ represents an integer selected from the group 0 and 1, and $z=2-x$.

9. An amine salt having the formula

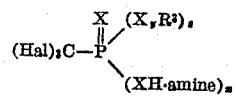

wherein Hal represents a halogen atom, of the group consisting of the bromine and chlorine atoms, X represents a non-metallic chalcogen atom, $R^3$ represents a member of the class consisting of the hydrogen atom and lower hydrocarbon groups, amine represents a long-chain, highly branched primary aliphatic hydrocarbon amine containing at least 8 carbon atoms, $x$ represents an integer selected from the group 1 and 2, $y$ represents an integer selected from the group 0 and 1, and $z=2-x$.

10. An amine salt having the formula

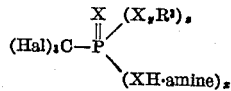

wherein Hal represents a halogen atom of the group consisting of the bromine and chlorine atoms, X represents a non-metallic chalcogen atom, $R^3$ represents a member of the class consisting of the hydrogen atom and lower hydrocarbon groups, amine represents a long-chain, highly branched primary aliphatic hydrocarbon amine containing at least 8 carbon atoms and having a tertiary alkyl structure, $x$ represents an integer selected from the group 1 and 2, $y$ represents an integer selected from the group 0 and 1, and $z=2-x$.

11. An amine salt having the formula

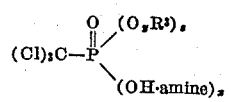

wherein $R^3$ represents a member of the class consisting of the hydrogen atom and lower hydrocarbon groups, amine represents a primary aliphatic $C_{12}$–$C_{24}$ alkylamine containing a tertiary alkyl structure, $x$ represents an integer selected from the group 1 and 2, $y$ represents an integer selected from the group 0 and 1, and $z=2-x$.

12. An amine salt having the formula

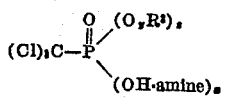

wherein $R^3$ represents a member of the class consisting of the hydrogen atom and lower hydrocarbon groups, amine represents a mixture of amines having the formula t-$C_nH_{2n+1}$·$NH_2$ wherein $n$ is a whole number from 12 to 15, $x$ represents an integer selected from the group 1 and 2, $y$ represents an integer selected from the group 0 and 1, and $z=2-x$.

13. The salt according to claim 12 where $x=2$.

References Cited in the file of this patent

UNITED STATES PATENTS

| 2,559,754 | Bittles et al. | July 10, 1951 |
| 2,573,568 | Harman et al. | Oct. 30, 1951 |

OTHER REFERENCES

Yakubovich et al.: Dodklady Akad. Nauk S. S. S. R. 71, 303–5 (1950), abstracted in: Chemical Abstracts, vol. 44, pp. 8320–8321.